E. S. CHURCH.
RECORDING AND CHANGE MAKING MACHINE.
APPLICATION FILED AUG. 3, 1906.
1,118,106.
Patented Nov. 24, 1914.
5 SHEETS—SHEET 1.
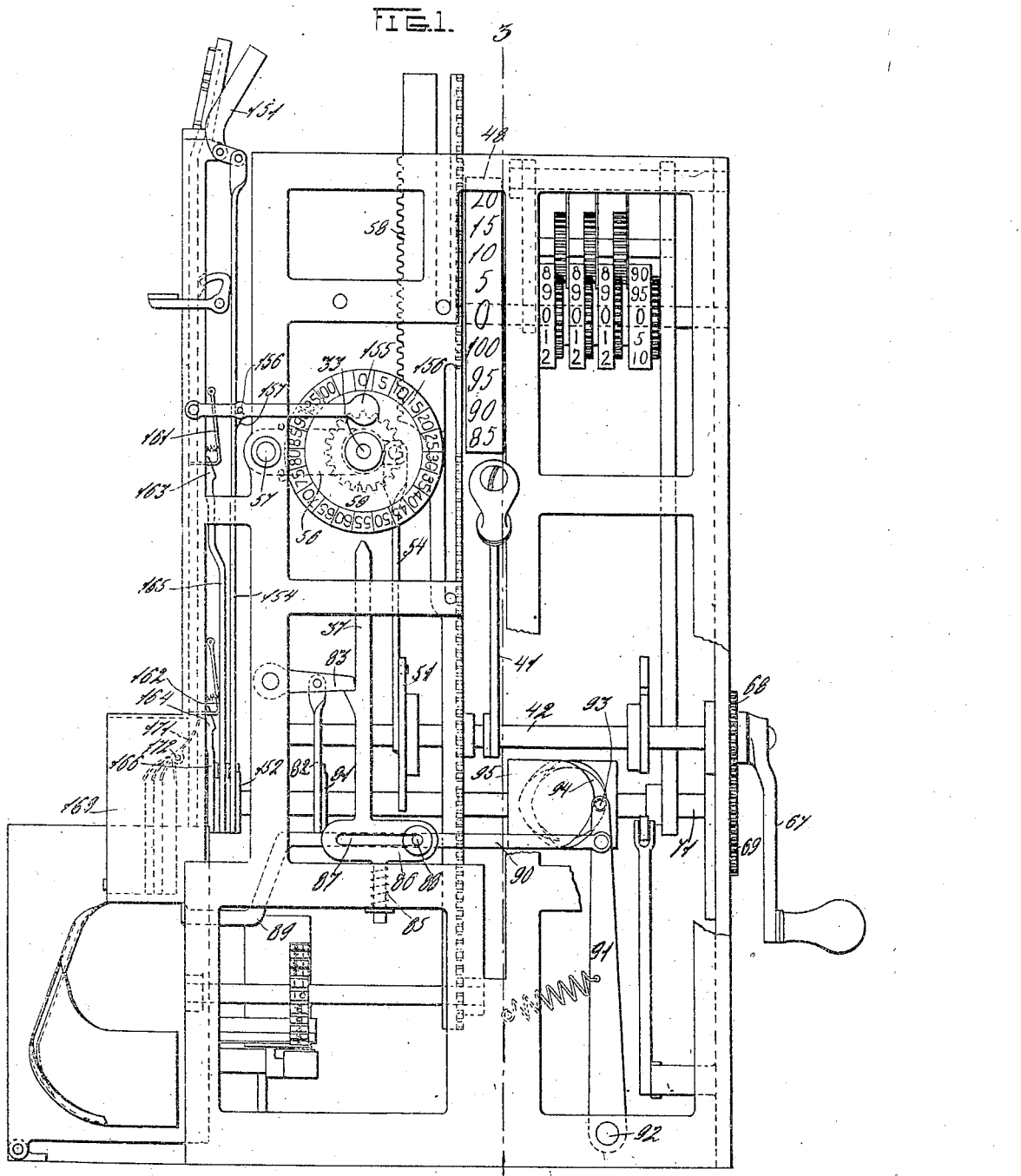

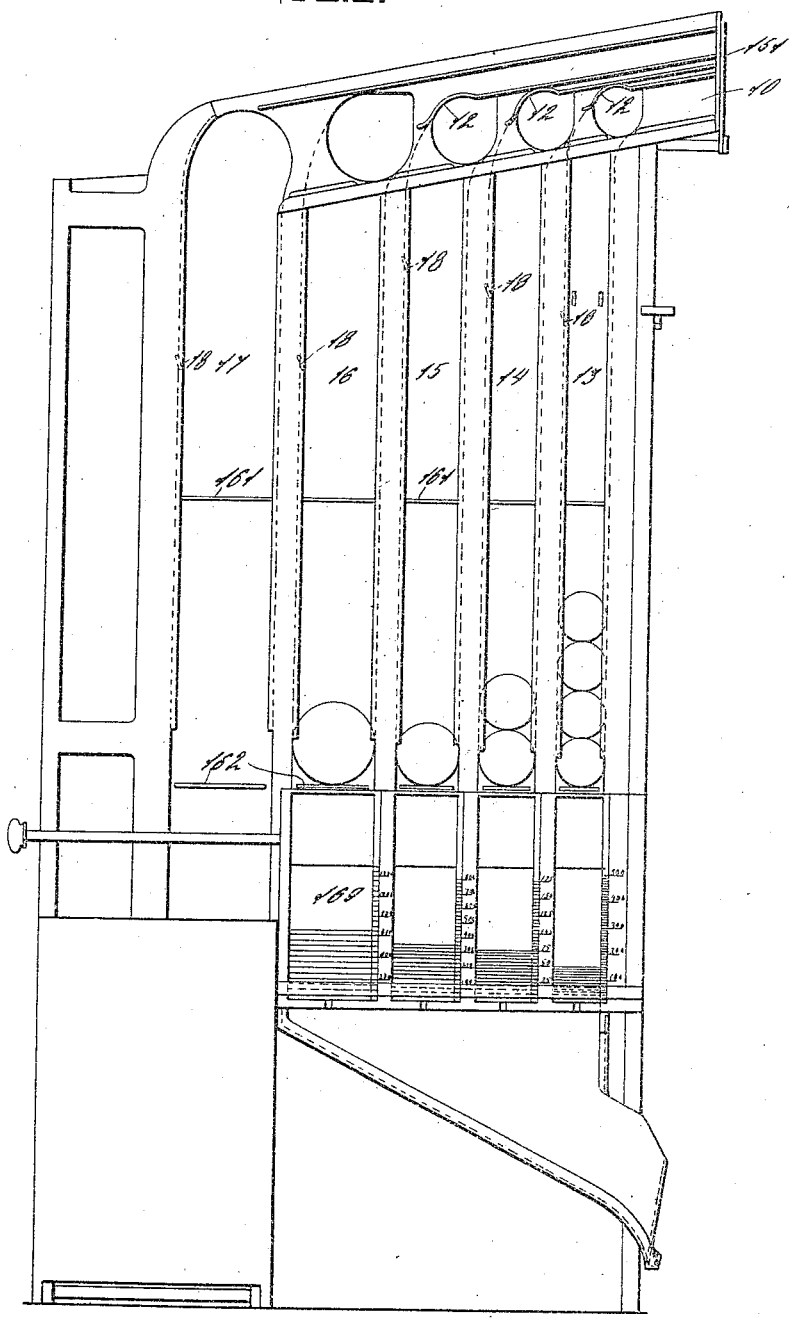

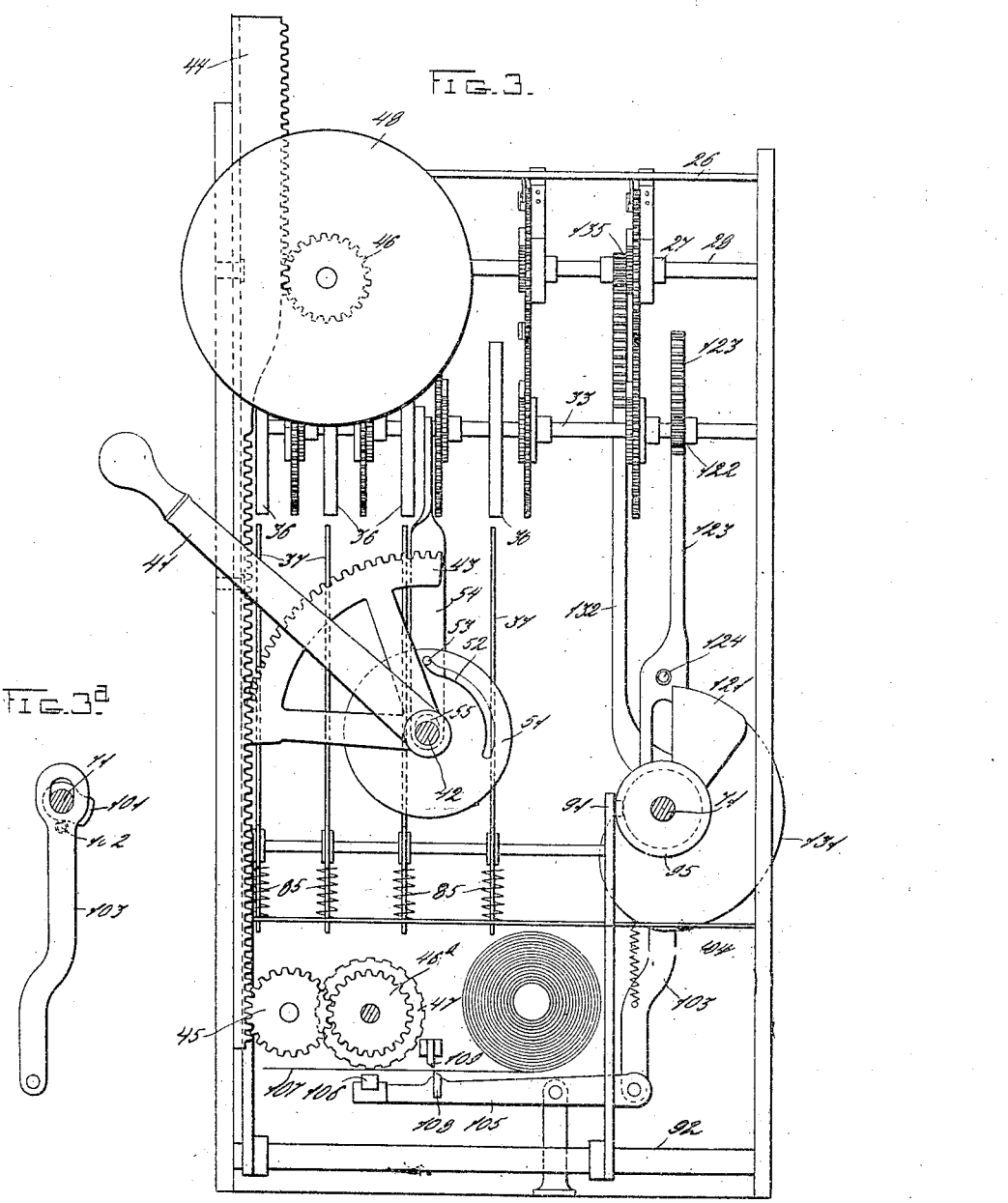

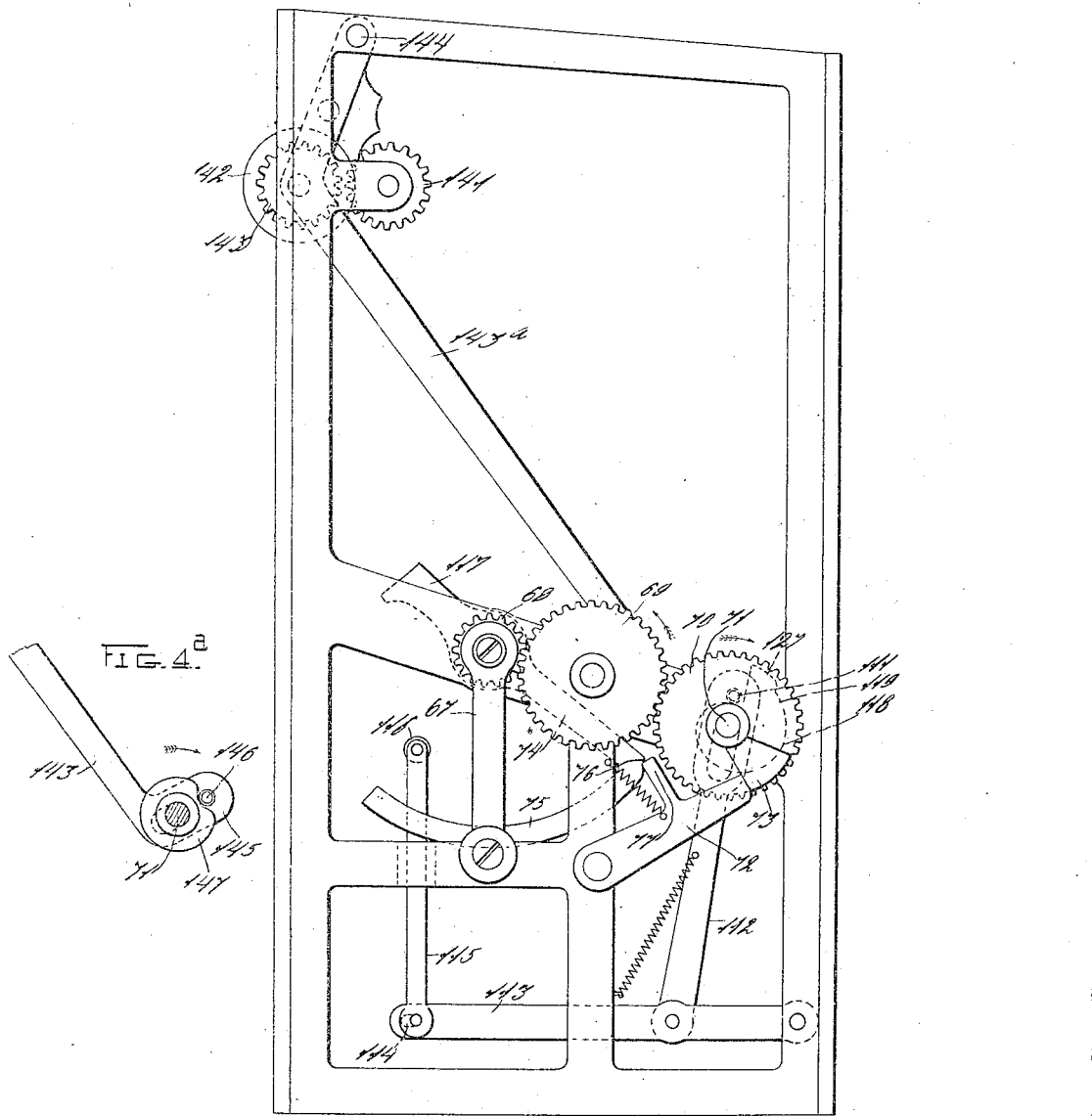

E. S. CHURCH.
RECORDING AND CHANGE MAKING MACHINE.
APPLICATION FILED AUG. 3, 1906.
1,118,106.
Patented Nov. 24, 1914.
5 SHEETS—SHEET 5.
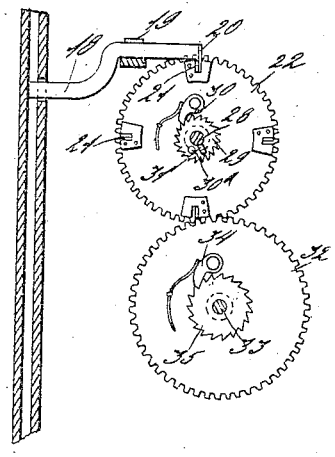
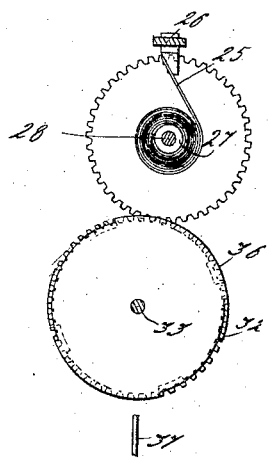
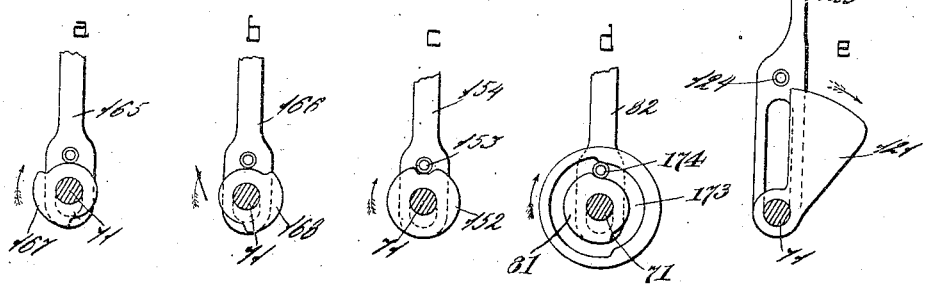
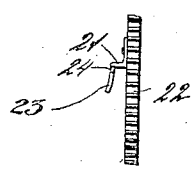
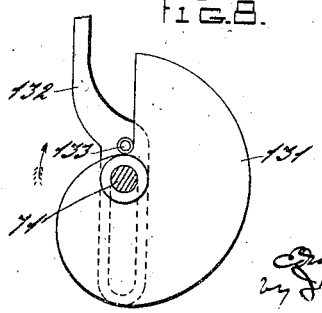

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

RECORDING AND CHANGE-MAKING MACHINE.

1,118,103.

Specification of Letters Patent.  Patented Nov. 24, 1914.

Application filed August 3, 1906. Serial No. 329,101.

*To all whom it may concern:*

Be it known that I, EDMUND S. CHURCH, a citizen of the United States, residing at Dayton, in the county of Montgomery and State of Ohio, have invented certain new and useful Improvements in Recording and Change-Making Machines, of which I declare the following to be a full, clear, and exact description.

This invention relates to change making cash registers and has among its objects to provide a machine which will issue a printed record such as a check showing the amount purchased and will at the same time automatically eject a required amount of change.

In many establishments the system used includes the purchase of checks from a cashier which are then taken to a sales counter and purchases made and then paid for by the use of such checks. My invention aims to provide a mechanism practically adapted for use in such connection which may be controlled by the deposit of a coin or coins in the machine and the movement of a device such as a lever determining the amount which is to be printed on the check.

The machine also provides means for automatically and without care on the part of the operator ejecting the change between the value of the coin inserted and the value of the check issued.

The invention also comprises means for registering and indicating the amount of the purchase and also for indicating the amount of change.

With these and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 is a front elevation of the complete machine with the casing removed. Fig. 2 is a fragmentary side elevation showing the coin tubes. Fig. 3 is a transverse section through the machine on the line 3—3 of Fig. 1, looking to the left. Fig. 3ª is a detail view of a lever and its operating cam. Fig. 4 is an elevation of the right hand side of the machine showing the operating mechanism. Fig. 4ª is a detail of the register controlling cam. Figs. 5 and 6 are views of the coin controlled deposit mechanism. Fig. 5ª is an edge view of part of the mechanism shown in Fig. 5. Fig. 7 includes a plurality of cam devices used in the machine. Fig. 8 is a detail view of a resetting cam for the deposit mechanism.

Described in general terms the machine may be said to include a coin controlled deposit mechanism. Into this mechanism coins are placed and are separated into denominations by a well known type of separating mechanism. In their passage through separate tubes for each denomination the coins serve to release a deposit mechanism which under the influence of a plurality of springs moves to an extent dependent on the value of the inserted coin. This serves to control in one sense or direction a selecting mechanism which in the present embodiment comprises a plurality of differentially graduated disks. When the purchase lever is moved to an extent determined by the value of the purchase or the check desired the selecting mechanism is withdrawn from the control of the deposit devices and is moved in the opposite sense or direction to an amount corresponding to the value of the purchase. The selecting mechanism is thereby left in an intermediate position indicative of the amount of change desired. When the operating handle or other operating device of the machine is moved the coin ejectors which are allowed to be operative by the selecting device are moved forwardly and the coins ejected into a tray. The movement of the purchase lever serves to set a printing mechanism herein shown as a type wheel and mechanism is provided connected to the operating handle for taking an impression from the said printing devices and for feeding the record paper. The further motion of the operating handle serves to reset all the parts of the machine and such resetting is accompanied by an operation of a register or other accounting device to retain in the machine an entry of the value of the purchase.

Referring now to the drawing Fig. 2 shows a coin chute 10 into which all the coins are placed no matter what their denomination. This chute is at an angle both in the direction of its length and of its cross section as shown in Figs. 1 and 2 so that the coins roll down the chute and also rub against the back thereof in their passage. Deflecting devices shown as curved strips 12 are provided, which in a well known manner serve to successively deflect the coins from the chute beginning with the smallest. As this mechanism is shown it is provided with a vertical chute 13 for dimes, 14 for five cent pieces, 15 for quarters, 16 for half dollars, 17 for silver dollars and the deflecting devices 12 are arranged to properly separate the coins into the vertical chutes. Such separating mechanisms are well known in the art and their operation will be obvious.

In their passage through the vertical chutes the coins abut one of the series of levers 18 the cam ends of which are shown in Fig. 2 and which are best shown as a whole in Fig. 5. As the coins descend they evidently rock the levers 18 in a horizontal plane around pins 19 as a pivot. The ends of lever 18 away from the coin chute are provided with lateral lugs 20 which are adapted to engage the flanges 21 mounted on gear wheels 22. As shown in Fig. 5 there are four of these flanges 21 this wheel being the twenty five cent wheel. It will be easily understood that the dollar wheel will have only one flange 21 the half dollar wheel will have two flanges at opposite ends of a diameter, the ten cent wheel will have ten flanges equally spaced around the circumference and the five cent wheel will have twenty flanges also equally spaced around the corresponding wheel 22. The flanges 21 have each right angle extensions 23 best shown in Fig. 5ª and in this extension is a vertical notch 24 through which the lug 20 on the lever 18 is adapted to be moved. The wheels 22 which are normally under spring tension are more fully described hereafter and it will be evident that when the coin is dropped into any of the vertical chutes that the lever 18 corresponding thereto will be rocked around its pivot 19 and the lug 20 carried through the notch 24 of the extension 23 on the flange 21. This will release the deposit gear 22 which will then be rotated under the influence of its spring and said rotation will continue until the succeeding extension 23 of a flange 21 reaches the lug 20 when the lever 18 will be rocked to its normal position by the inclined extension 23, the wheel 22 again being locked by the succeeding flange 21 pressing against the lug 20.

There is a separate spring 25 (see Fig. 6) for each deposit gear 22 the springs being fastened at one end to the frame bar 26 and at the other end fast to a sleeve 27 surrounding a shaft 28. Also mounted on the sleeves 27 are ratchets 29 with which pawls 30 mounted on the deposit gears 22 are adapted to engage and be moved thereby. Also mounted on each of the ratchets 29 is a pin 30ª adapted to be engaged, for a purpose hereinafter described, by the lug 31 on the shaft 28. Geared to each of the deposit gears 22 is an intermediate gear 32 loose on the selecting shaft 33. These gears 32 have each a pawl 34 mounted thereon and these pawls engage and operate ratchets 35 which are tight on the selector shaft 33. This mechanism provides for rotating the selector shaft 33 from any of the deposit gears 22 either singly or in succession. When any deposit gear is released by the flange 20 the resistance to the movement of the corresponding spring 25 is withdrawn. The sleeve 27 carrying ratchet 29 is thereby rotated. This evidently will rotate gear 22 through the agency of pawl 30 until the said gear is stopped by the succeeding flange 21 as before described. Such rotation of gear 22 will also serve to rotate gear 32 and thus through pawl 34 will rotate the selector shaft 33 all the parts having moved to an amount commensurate with the value of the coin inserted. If a second coin of the same or another denomination is inserted the operation will be repeated and the selector shaft 33 move an additional distance, the remaining ratchets 35 riding under their pawls 34 as will be easily understood.

Mounted rigidly on the selector shaft 33 are a series of differentially graduated cam disks 36 which serve to control and determine the amount of movement of a series of ejector regulators 37 one for each denomination of coin to be ejected. I have shown four of the selecting disks 36 and the ejector controllers 37 they being adapted to determine the motion of ejectors for five, ten, twenty five and fifty cent coins.

The deposit mechanism of the machine has now been described and I will pass to the purchase mechanism. This mechanism includes a setting lever 41 best shown in Fig. 3 which is mounted on a shaft 42 and serves to determine the amount of movement of a segment gear 43. This gear meshes with the vertical rack bar 44 the teeth of which mesh also with a printer gear 45 and an indicator pinion 46 at the bottom and top respectively. The printer gear 45 meshes with a gear 46ª which is rigidly connected to a printing wheel 47. The indicator pinion 46 is rigidly connected to a cylindrical indicator 48 having numerals from five cents to one dollar in multiples of five. Also mounted on shaft 42 is a cam disk 51 having a cam groove 52 in which a pin 53 on a vertical reciprocating lever 54 is adapted to ride. This lever is supported by shaft 42 and is allowed through the agency of an elongated slot 55 to have a slight vertical motion. This vertical arm 54 is connected as shown in Fig. 1 to a horizontal arm 56 journaled on the pin 57 on the main frame. In this arm is carried the selector shaft 33. The vertically moving rack bar 44 has a right angle flange 58 shown in Fig. 1 and this is adapted to engage the pinion 59 rigid on the selector shaft when the flange rack 58 has been slightly depressed.

It will be clear that the purchase mechanism offers no obstacle to the movements of the selecting devices in what may be called a positive sense or direction. When the setting lever 41 is moved from the normal position the inclined portion of cam groove 52 will immediately serve to depress the vertical arm 54. This will evidently rock downwardly the arm 56 and so serves to depress the selector shaft 33 with drawing gears 32 from the deposit gears 22. On the further motion of the setting lever 41 the rack 58 is brought into mesh with the pinion 59 on the selector shaft 33 and the shaft reversely rotated to an amount dependent on the further movement of lever 41 and therefore agreeing with the amount of the purchase. This evidently serves to reset the selecting mechanism and leave the same at an intermediate position representing the amount of change to be ejected. The rotation of the main handle then serves to complete the operation. This handle 67 is mounted on the outside of the main frame and is connected through a gear 68 and a gear 69 to a gear 70 mounted rigid with the main operating shaft 71 these parts being best shown in Fig. 4. Means are provided for locking the operating handle 67 until the setting lever 41 has been moved and this locking means comprises an arm 72 which is spring drawn against the lug 73 rigid with the operating shaft 71. Mounted on the shaft 42 which supports the purchase lever is a second lever 74 having a segmentary extension 75 slightly cut away at one end to form a depression 76. A projecting arm 77 on the locking arm 72 normally engages the depressed portion 76 of the arm 74. It will be evident that a movement of setting lever 41 from normal position will serve through the depression 76 and the projection 77 to rock the arm 72 against the tension of its spring and thereby withdraw the arm from locking position. This arm will evidently be held from locking position as long as setting lever 41 remains from its normal place.

Carried by the main operating shaft 71 is a cam 81 shown in Fig. 1 and also at $d$ in Fig. 7. This box cam is provided with the groove 173, which groove coöperates with the anti-friction roller 174 mounted on an arm 82 to raise the arm 82 which straddles the shaft 71 and thereby raises the arm 83 which releases the ejector controllers 37, these ejector controllers are in the form of vertical bars as shown and are normally pressed upward by springs 85. A horizontal extension 86 of the controllers is provided with a slot 87 and in this is adapted to ride a pin 88 connected to the ejector 89 and also to a main operating arm 90. These arms 90 are connected to levers 91 which are pivoted on a shaft 92 on the main frame and one of which is provided at its upper end with an anti-friction roller 93 moving in a cam groove 94 in a cylinder 95. This cylinder is rigidly carried by main shaft 71 and the shape of the cam groove 94 is such that the levers 91 will be rocked to the left and then back again at each rotation of the shaft. This movement through the operating arm 90 serves to reciprocate all the ejectors 89 and those of the ejectors which have been allowed to rise owing to the graduations on selector disks 36 will eject the desired coin. When the main operating shaft has completed a half rotation the depressed portion of cam 81 will reach the anti-friction roller of vertical arm 82 and the said arm be depressed thereby withdrawing the ejector controllers 37 to their normal position.

The shaft 71 carries a cam 101 (see Fig. 3ª) which is adapted to engage and depress an anti-friction roller 102 mounted on arm 103. This arm 103 is as shown in Fig. 3 normally drawn upward by a spring 104 and is connected at the bottom to a platen lever 105. This lever carries a platen 106 adapted to press a record 107 against the type wheel 47 and it also carries a movable knife blade 108 adapted to coöperate with the stationary knife blade 109 and thereby sever the record paper into separate checks.

The latter part of the rotation of the main operating shaft 71 serves to reset the parts to normal position. Referring to Fig. 4. it will be seen that I provide an anti-friction roller 111 carried by a link 112 straddling the shaft 71 and to which is connected a second link 113. This link 113 is joined by pin and slot connection 114 to a vertical arm 115. This arm carries at the top thereof an anti-friction roller 116 adapted to engage and operate an arm 117 carried rigidly with the setting lever 41. It will be evident that the shape of cam 118 which operates the friction roller 111 is such as to cause a considerable elevation of the arm 115 and so is sufficient to reset the setting lever 41. It will be noted however that at the point marked 119 the cam 118 has a circular or non-spiral part and it will be evident that when this part of the cam is moving under the roller 111 that no motion of arm 115 will then be produced. This cessation of movement of arm 115 is for the purpose of allowing the resetting of the selecting devices. It will be clear that as said lever 41 is returned to normal the rack bar 44 will also be restored and will finally carry its rack 58 out of mesh with the selector pinion 59 but this restoration of rack 58 will evidently cause the selecting mechanism to again assume its deposit position inasmuch as the rack 58 is connected to the selecting mechanism in what I have termed the negative sense. The selecting mechanism must then be returned to normal independently and this must also take place before the selecting shaft 33 is raised to again mesh the gears 32 with the deposit gear 22, as these gears 22 cannot be reversely moved.

From what has been stated it will be seen that the setting lever 41 is raised by cam 118 until the rack 58 has completely passed out of mesh with the selector pinion 59 but the inclined portion of cam groove 52 has not yet reached the roller 53 and so has not elevated the arm 54 to restore the selecting mechanism to its normal upper position. At this place the circular portion of cam 118 reaches the anti-friction roller 111 and allows time for the selecting mechanism to be reset. This resetting of the selecting mechanism is provided by the cam 121 shown in Fig. 3 and also in detail at $e$ of Fig. 7. Selecting shaft 33 carries a pinion 122 with which meshes a vertical rack bar 123. This bar 123 has mounted thereon an anti-friction roller 124 and the bar is adapted to straddle the main operating shaft 71 by means of a long slot in the said rack bar. In Fig. 3 the mechanism is shown in normal position and it will be seen that the anti-friction roller 124 has a free path for its downward movement under the influence of selecting shaft 33. The main shaft 71 moves in the direction of the arrow and as it nearly completes its rotation cam 121 will strike the anti-friction roller 124 in its more or less depressed position and rapidly reset the same to normal. This serves to restore the selecting mechanism and immediately thereafter the projection 127 of cam 118 serves to complete the final movement of the purchase mechanism and to allow the selecting device to assume its normal upward position through the agency of the inclined portion of cam groove 52. To again tension springs 25 an additional cam on main shaft 71 is provided. This cam is shown in Figs. 3 and 8 and is indicated by numeral 131. The cam 131 is adapted to elevate the rack bar 132 through a friction roller 133 carried on the said rack bar. The rack teeth of said bar engage a pinion 135 on the shaft 28. It will be remembered that the shaft 28 carries a series of lugs 31 which are adapted to be engaged by pins 30$^a$ carried by ratchet 29. It will be evident that when the ratchets 29 are moved to position the deposit gears 22, the pins 30$^a$ will be given a degree of movement corresponding to the lost tension of the springs 25. As the restoring cam 131 is rotated, the rack bar 132 will be elevated and will serve to rotate the shaft 28 in a direction contrary to the direction of rotation of the ratchets 29 and deposit gears 22 during their adjusting movement. During such rotation of the shaft 28, the lug 31 mounted on the same will engage the pins 30$^a$ and carry said pins together with their ratchets back to normal position thereby again tensioning the springs 25 which are rigidly connected to the sleeves 27 carrying said ratchets. The anti-friction roller 133 will then have passed over the high point of the cam 131 and will allow the rack bar 132 to drop back to normal position thus giving the shaft a reverse rotation to normal position.

I have provided a registering mechanism shown in Figs. 1 and 4 and this is arranged to be operated by the restoration of said lever 41 and rack bar 44 to normal position. The indicator pinion 46 is rigidly connected to a second pinion 141. The register 142 comprises a series of wheels having transfer mechanism the wheel of lowest order being adapted to engage through a pinion 143 with the other said pinion 141. The register 142 is carried on a frame comprising arms 143$^a$ pivoted at 144 to the main frame and having at the lower end thereof right angled extensions 145. These extensions 145 carry anti-friction rollers 146 adapted to be moved by cams 147 mounted on main shaft 71. It will be seen from the shape of cams 147 that the first part of the rotation of shaft 71 will rock the frame arms 143$^a$ upwardly and thereby cause register pinion 143 to engage its operating pinion 141. As the pinion 141 is restored by the restoration of setting lever 41 it will be seen that at this time an addition is made on the counter the amount being equal to the extent through which the purchase lever 41 has been moved.

The machine as thus far described is completely operative but I have provided devices for preventing a manipulation of the machine. Among these may be stated the provision of means for preventing the insertion of a coin after the operating handle has started to move. This includes a shield 151 adapted to move over the entrance to coin chute 10 this motion being caused by a cam 152 on main shaft 71 acting on an anti-friction roller 153 which is carried by and operates a vertical rod 154. This cam device is shown in detail at $c$ of Fig. 7 and the arm and shield are best shown in Fig. 1. It will be evident that the shape of cam 152 will cause an immediate elevation of bar 154 after the starting of the operating handle. This will move shield 151 over the entrance of chute 10 and will maintain it in such position during practically the entire operation of the machine.

A flash or shutter 155 is provided for the change indicators 156. Referring to Fig. 1 it will be seen that this change indicator is mounted on the selector shaft 33 and serves to indicate first the amount inserted and thereafter the amount of change due. The flash 155 has a pin 256 adapted to be engaged and elevated by a projection 157 carried by the arm 154 and it will be evident that when arm 154 is raised at the beginning of the operation of the main handle the flash 155 will be also raised and will obscure the change indicators 156 and this indicator will remain obscured until the very end of the operation at which time it has been reset to normal position.

To furnish a coin displaying means I have provided mechanism also shown in Fig. 1. It may be found desirable to retain the coins last inserted in a position where they may be viewed for one or two succeeding operations. To this end I have provided obstructions 161 and 162 in the vertical coin chutes. These are spring pressed to obstructing position and cams 163 and 164 are provided to withdraw them successively therefrom. These cams 163 and 164 are formed respectively at the top of arms 165 and 166. The arms are adapted to be operated successively by cams 167 and 168 shown at a and b of Fig. 7 which are carried by the main shaft 71. It will be seen that the cam 167 will elevate arm 165 near the beginning of the operation of the machine and serve to withdraw the obstructing arm 161 from the vertical chutes. The inserted coins will then drop to the second obstructing arm 162 from which they are released when cam 168 withdraws the said obstructing arm. The coins are then allowed to pass to the tubes 169 from which they may be ejected as desired.

Inasmuch as coins may be inserted in the machine faster than they are used from some particular tube 169 I provide means for taking care of such over supply of coins. As shown in Fig. 1 I have provided a plurality of deflecting arms 171 journaled on the rod 172 the upper ends of which are normally in rear of the vertical coin chutes so that the descending coins will be deflected into the tube 169. If however the tube becomes full of coins a succeeding coin will not be allowed to completely pass the deflecting element 171 but will rest on the lower edge thereof and thereby slightly rotate the same from the position shown in Fig. 1 to bring the upper end of the deflector forward of the vertical coins chute. Any succeeding coins passing down the chute will thereby not be deflected into the tube 169 but will be allowed to continue their vertical motion into any convenient receptacle. When however the coins in the particular tube 169 become partly exhausted the deflector 171 will again move to its normal position and again serve to deflect the coins.

The operation of this machine will probably be evident from the foregoing description but may be briefly described as follows: I will assume that a check to the value of sixty cents is desired and that seventy five cents comprising one half dollar and one quarter have been tendered in payment. The coins are successively placed in coin chute 10 and roll therein until they reach the proper vertical coin chute. The half dollar will be deflected and descend through the chute 16 while the quarter will drop through the chute 15. In their passage the coins will strike the forward cam ends of the levers 18 for the particular chutes and rock said levers around their pivots 19, successively releasing the deposit gears 22. It will be remembered that the half dollar gear 22 has only two flanges 21 so that the release of this gear will allow a rotation through 180 degrees. The lever 18 which is moved by the twenty five cent coin will allow its deposit gear 22 to move one fourth of the complete rotation or through 90 degrees. When either of the deposit gears are released the corresponding spring 25 immediately rotates the same, the said spring being fastened to sleeve 27 on which is also mounted the ratchet 29. This ratchet as before stated serves to actuate its corresponding pawl 30 mounted on the deposit gear. The rotation of the deposit gears serves to rotate the corresponding gears 32 and these through pawls 34 and ratchets 35 rotate the selecting shaft 33. On this selecting shaft the disks 36 are mounted, and when the shaft has finished its movement the disks will present graduations directly over the ejector controllers 37 to eject seventy five cents from the machine. The setting handle 41 is next moved to the purchase amount, that is, sixty cents. This motion through the segment gear 43 serves to set the indicator 48 and the printing wheel 47 to a position to indicate and print the said amount. The first element of movement of the lever 41 depresses the vertical arm 54 through the agency of cam slot 52 and such depression lowers the selecting shaft 33 thereby withdrawing the gears 32 carried thereby from connection with deposit gears 22. The further motion of setting handle 41 causes the rack 58 to mesh with pinion 59 on the selector shaft and reversely rotate the same. At the conclusion of such rotation the graduated disks mounted on the same are in position to eject fifteen cents in change. When the main operating handle 67 is rotated the locking lever 83 releases the ejector controllers 37 which then rise to an amount determined by the position of the graduated disks. The ejectors 89 are thereby brought into position to eject the proper coins. This ejection is caused by the reciprocation of lever 91 through the agency of cam groove 93. It will of course be understood that the movement of the operating handle is prevented until the setting lever 41 has been moved, as the handle is normally locked by the arm 72 this arm being displaced from locking position by the movement of the setting handle. The further rotation of the operating handle raises the arm 115 thereby restoring the setting lever through its arm 117 and as at this time the register 142 has been thrown into connection with the gear 141 such restoration serves to add the proper purchase amount on the register. The mechanism shown in Fig. 3ᵃ has served to imprint the amount on the record 107 and to cut off the check. The last part of the rotation of the operating handle serves to reset the selecting mechanism and the deposit mechanism through the agency of cams 121 and 131 so that at the end of the operation the mechanism has all returned to normal position.

The shield 151 prevents the insertion of additional coins after the operating handle has started and the obstructions 161 and 162 serve to divide the downward movement of the inserted coins into three parts. The deflecting devices 171 serve to deflect coins (to a receptacle) which are not needed for making the proper change.

It will be observed that the cams 18 are staggered as shown in 2. This arrangement is desirable to provide enough space beneath the cams to contain the largest number of coins likely to be deposited at once and at the same time leave enough space above the cams so that the falling coins may attain a velocity great enough to trip said cams. Thus, the twenty five cent cam 18 is higher than the five cent cam, which is itself higher than the ten cent cam. The fifty cent cam is lower than any of the cams of smaller value but fewer fifty cent pieces are likely to be deposited at one operation.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed as new is as follows:

1. In a machine of the class described, the combination with a selecting device, of coin controlled spring operated devices for moving same, a manipulative device for reversely moving said selector differentially, and means for ejecting an amount of change determined by the final position of said selecting device.

2. In a machine of the class described, the combination with a selector comprising a plurality of graduated disks, of spring means for setting same released and controlled by an inserted coin, a hand operated device controlling reverse movement of said selector, and ejecting devices controlled by the resultant position of said selector.

3. In a machine of the class described, the combination with a selecting device, of coin controlled devices for adjusting same, a hand operated purchase device, means controlled thereby for withdrawing the selecting device from under control of the coin controlled devices, means controlled by said hand operated device for reversely adjusting said selecting device, and means to eject change to an amount dependent on the final position of said selecting device.

4. In a machine of the class described, the combination with a change selecting device, of coin controlled spring operated devices for adjusting same, a manipulative means for readjusting said selecting device, means for ejecting change to an amount dependent on the readjusted position of said selecting device, and an automatic means for restoring said selecting device to normal position at each operation.

5. In a machine of the class described, the combination with means for controlling the ejection of change, of mechanism for adjusting said controlling means commensurately with the total value of one or more coins deposited, means for readjusting said means commensurately with the purchase, means for ejecting the change and means for printing and severing a check bearing printed characters indicating the amount of purchase.

6. In a machine of the class described, the combination with a selecting device of spring operated devices rendered effective by deposited coins for giving the same a degree of movement dependent upon the total of one or more coins deposited, a manipulative device for reversely moving said selector differentially, and means for ejecting an amount of change determined by the final position of said selecting device.

7. A machine of class described adapted to receive a deposit of one or more coins, of a selecting device operated by the insertion of said coins to present the total value of the same, of a manipulative amount determining device for setting up the amount of purchase and giving to the selecting device a second adjustment to present finally an amount representing the difference between the total value of coin or coins deposited and the amount of the purchase and coin ejectors operable according to the final adjustment of the selecting device.

8. In a machine of the class described, the combination with a selecting device, of means for adjusting it in correspondence with a deposited amount, a manipulative purchase amount determining device, means operated thereby for readjusting the selecting device, printing mechanism set from said manipulative device, means for printing and severing a printed purchase amount check, and means for ejecting an amount of change dependent on the final position of the selecting device.

9. In a machine of the class described, the combination with a change selecting device of coin controlled means for adjusting same, a manipulative purchase amount determining device for readjusting the selecting device, printing mechanism also adjusted by said determining device, and an operating mechanism serving to eject change, dependent in amount on the final adjustment of the change selecting device, and to print and sever a purchase check.

10. In a machine of the class described, the combination with a selecting device of coin controlled means for adjusting same, a purchase amount device for readjusting said selecting device, printing mechanism also adjusted by said purchase device, and an operating mechanism for printing from said mechanism and severing a purchase check, and also ejecting change, the amount of change and the amount on the printed check being together equal to the amount inserted.

11. In a machine of the class described, the combination with a change selecting device comprising a plurality of graduated disks, of spring operated deposit means rendered effective by inserted coins for adjusting same in one sense, manipulative purchase means for readjusting said selecting device in an opposite sense, ejectors and ejector controllers, springs for forcing said controllers against the graduated disks, and means for operating the ejectors.

12. In a machine of the class described, the combination with a change selecting device, of means normally operative and adapted to be set in motion by deposited coins for adjusting same to correspond with a deposited amount, means for readjusting the selecting device to an extent equal to the amount of purchase, ejecting devices, ejector controllers adapted when released to move the ejecting devices to an extent depending on the selecting device, and operating mechanism for the ejectors when so moved.

13. In a machine of the class described, the combination with deposit devices, of springs normally restrained but rendered effective by deposited coins for moving same, manipulative purchase amount devices, a selecting device, controlled in opposite senses by the deposit and purchase devices, means for ejecting the change, and an operating mechanism for operating the change ejecting means, for restoring the selecting device to normal and for winding said springs.

14. In a machine of the class described, the combination with a selecting device, of coin controlled deposit devices for adjusting the selecting device, gearing connecting said selecting and deposit devices, manipulative purchase devices, means operated thereby for readjusting said selecting device, cam means operated by said manipulative device for destroying the gear connection between said selecting and deposit devices and means for restoring said selecting device to normal position at each operation.

15. In a machine of the class described, the combination with a selecting device and coin controlled means for adjusting same, of a manipulative device for also adjusting said selecting device, a handle and connections for causing an operation of the machine and means for locking the handle until the manipulative device has been adjusted.

16. In a machine of the class described, the combination with a selecting device, and an indicator movable therewith, of a coin chute, into which coins are placed to control said selecting device, means for closing said chute, means for concealing said indicator and a common operating means for said closing and said concealing means.

17. In a machine of the class described, the combination with a coin assorter, of a series of coin chutes one for each denomination of coin, of a series of coin holders each appropriate to one of said chutes and adapted to receive the assorted coins, a series of pivoted devices each appropriate to one of said coin holders and its appropriate chute, adapted when the holder is filled with coins to allow coins to pass out without entering said holder.

18. In a machine of the class described, the combination with a change selector, of means operated by deposited coins for adjusting same in one sense to correspond to amount, a deposited manipulative means for readjusting said selector in an opposite sense to an amount depending on the purchase, a purchase register, means for resetting the manipulative means to normal position and connections for actuating the register by resetting the said manipulative means.

19. In a machine of the class described, the combination with coin carriers having a coin opening and means for closing same, of coin ejectors, common operating means therefor, and means connecting the said operating means to the means for closing the coin opening when any of the coin ejectors are operated.

20. In a machine of the class described, the combination with coin chutes, of controlling mechanisms projecting into said chutes and adapted to be actuated by passing coins, said controlling mechanisms having a staggered arrangement.

21. In a machine of the class described, a graduated change determining device, the adjustment of which is effected by deposited coins and purchase determining means coöperating with said device.

22. In a machine of the class described, a change determining device, an adjustment of which is effected by deposited coins, and a manipulative device for readjusting said change determining device so that an amount of change may be ejected commensurate with its final position.

23. In a machine of the class described, the combination with a selecting device adapted to be differentially adjusted by deposited coins, a manipulative device for readjusting said selector differentially, and means for ejecting an amount of change determined by the final position of said selecting device.

24. In a machine of the class described, the combination with a selecting device adapted to be differentially adjusted by deposited coins to an extent commensurate with the value of the coins deposited, a manipulative device for readjusting said selector to an extent commensurate with the amount of purchase, and means for ejecting an amount of change determined by the final position of said selecting device.

25. In a machine of the class described, the combination with a selecting device, of two successively operating means for adjusting said device in opposite senses the final position of said selecting device determining the amount of change to be ejected, and mechanism for bodily moving the selecting device from connection with one operating means to connection with the other.

26. In a machine of the class described, the combination with a selecting device, of two successively operating means for adjusting said device in opposite senses the final position of said selecting device determining the amount of change to be ejected, and mechanism under the control of one of the operating means for bodily moving the selecting device from connection with one to connection with the other of the operating means.

27. In a machine of the class described, the combination with a selecting device, of two successively operating means for adjusting said device in opposite senses, the final position of said selecting device determining the amount of change to be ejected, change ejecting devices, mechanism under the control of one of the operating means for bodily moving the actuating device from connection with one to connection with the other of the operating means, and means for operating the ejecting devices to eject the change determined by the selective device, return the selective device to normal position and finally move the selecting device bodily back to connection with the first operating means.

28. In a machine of the class described, the combination with a change indicator, of two successively operating means for adjusting said indicator in opposite senses the final position of said change indication indicating the amount of change due, and mechanism for bodily moving this indicator from connection with one to connection with the other operating means.

29. In a machine of the class described, the combination with a change indicator, of an operating means therefor constructed to adjust said indicator to a position to indicate the amount tendered, a second operating means constructed to readjust said indicator a distance proportionate to the amount purchased and thereby bring the indicator to a position to indicate the change due, and means controlled by the second operating means for bodily shifting the indicator from connection with the first to connection with the second operating means.

30. In a machine of the class described, the combination with a change indicator adapted to be differentially adjusted by deposited coins to indicate the value of the coins tendered, of means for readjusting said indicator a distance proportionate to the amount purchased and thereby bring the indicator to a position to indicate the change due, means controlled by the second operating means for bodily shifting the indicator from connection with the first to connection with the second operating means, and mechanism for returning the indicator to the amount tendered position while the second operating means is in engagement therewith, then disengaging the indicator from the second operating means and returning it to zero position, and finally reëngaging the indicator with the first operating means.

31. In a machine of the class described, the combination with a coin assorter, of an indicating mechanism constructed temporarily to indicate the total value of successively deposited coins of a single transaction, means controlled by the assorted coins for actuating the said indicating mechanism and means for automatically resetting said indicating mechanism to normal position at each operation of the machine.

32. In a machine of the class described, the combination with a coin assorter, of an indicating mechanism constructed to indicate the total value of successively deposited coins, and an escapement mechanism controlled by the assorted coins for actuating the said indicating mechanism.

33. In a machine of the class described, the combination with a coin assorter constructed to direct coins of various denominations into different channels, an indicating mechanism constructed temporarily to indicate the total value of the deposited coins tendered in a single transaction, means actuated by the passage of the coins through the channels for controlling the operation of the indicating mechanism and means for automatically restoring said indicating mechanism to normal position at each operation of the machine.

34. In a machine of the class described, the combination with a coin assorter constructed to direct coins of various denominations into different channels, of means for displaying the deposited coins, an indicating mechanism constructed to indicate the total value of the coins displayed at any time, and means actuated by the passage of the coins through the channels for controlling the operation of the indicating mechanism.

35. In a machine of the class described, the combination with a coin assorter constructed to direct coins of various denominations into different channels, of means for displaying the deposited coins, an indicating mechanism constructed to indicate the total value of coins displayed, and an escapement mechanism actuated by the passage of the coins through the channels for operating the indicating mechanism.

36. In a machine of the class described, the combination with a change determining device, an adjustment of which is effected by deposited coins, a manipulative device for readjusting said change determining device and a single indicating mechanism for indicating the extent of each adjustment.

37. In a machine of the class described, the combination with a change determining device, an adjustment of which is effected by deposited coins, an indicator for temporarily indicating the extent of such adjustment, a manipulative device for readjusting said change determining device, and a second indicator for indicating the extent of readjustment and means for causing said first mentioned indicator finally to indicate the difference in the extents of said adjustment and readjustment.

38. In a machine of the class described, the combination with a coin holder, of a chute leading to said holder, and a pivoted device projecting into said chute and constructed to be moved by a coin and retained in moved position by the coin when the holder is full whereby to deflect a following coin.

39. In a machine of the class described, the combination with a change determining device having graduations, of means tending to move said determining device, and coin controlled mechanism normally holding said moving means against movement.

40. In a machine of the class described, the combination with a change determining device having graduations, and means tending constantly to move said determining device, of coin controlled mechanism normally holding said moving means against movement, and a manipulative device constructed to move said determining device in the reverse direction, whereby its final position may determine the proper change.

41. In a machine of the class described, the combination with a change determining device having graduations, of mechanism normally preventing movement of said determining device but constructed to be released by the deposit of a coin, and means for moving said determining device when the same has been released.

42. In a machine of the class described, the combination with a change determining device having portions of graded size, an element normally latching said determining device against movement, a chute through which coins may pass and into which said latching element extends whereby said latching element is released by passing coins, and means for moving said change determining device when the same has been released.

43. In a machine of the class described, the combination with a coin assorter, of an indicating mechanism, means tending to move said indicating mechanism from normal zero position, and devices normally latching said indicating mechanism but constructed to be released by coins which have passed through said assorter.

44. In a machine of the class described, the combination with a coin assorter constructed to direct coins of different denominations into different channels, of an indicating mechanism, means tending to move said indicating mechanism from a normal zero position, and devices, one projecting into each of said channels, normally latching said indicating mechanism and constructed to be released by coins passing through said channels.

45. In a machine of the class described, a graduated change determining device, and mechanism for adjusting the change determining device adapted to be set in operation by deposited coins.

46. In a machine of the class described, a change determining device, mechanism for adjusting the change determining device adapted to be set in operation by deposited coins, and a manipulative device for readjusting said change determining device so that an amount of change may be ejected commensurate with its final position.

47. In a machine of the class described, the combination with a selecting device, mechanism for adjusting said selecting device adapted to be set in operation by deposited coins, a manipulative device for readjusting differentially said selecting device, and means for ejecting an amount of change determined by the final position of said selecting device.

48. In a machine of the class described, the combination with a selecting device, mechanism for adjusting the selecting device adapted to be set in operation and controlled in its movement by deposited coins to an extent commensurate with the value of coins deposited, a manipulative device for readjusting said selecting device to an extent commensurate with the amount of purchase, and means for ejecting an amount of change determined by the final position of said selecting device.

49. In a machine of the class described, the combination with a change ejecting mechanism, of coin controlled devices for adjusting said change ejecting mechanism, mechanism for registering purchases, and means controlled by said latter mechanism for making said coin controlled devices ineffective.

50. In a machine of the class described, the combination with a coin tube, of a coin ejector movable transversely to the axis of the tube for ejecting coins and differentially movable along the length of the tube for determining the number of coins to be ejected, and means for imparting to the ejector such movements.

51. In a machine of the class described, the combination with coin holders, of coin ejectors, coin controlled spring operated selecting mechanism for the ejectors, and means for operating the ejectors.

52. In a machine of the class described, the combination with coin holders, of coin ejectors, and coin operated ejector selecting mechanism operative in a continuous direction by the successive insertion of coins into the machine, and means for driving the ejectors.

53. In a machine of the class described, a change determining device, the adjustment of which is automatically controlled by deposited coins, and a manipulative device for readjusting the change determining device so that an amount of change may be ejected commensurate with its final position.

54. In a machine of the class described, the combination with a differentially adjustable selecting device adapted to be automatically controlled as to adjustment by deposited coins, a manipulative device for readjusting the selecting device differentially and means for ejecting an amount of change determined by the final position of the selecting device.

55. In a machine of the class described, the combination of a differentially adjustable selecting device automatically controlled as to adjustment by deposited coins to an extent commensurate with the value of the coins deposited, a manipulative device for readjusting the selecting device to an extent commensurate with the amount of purchase, and means for ejecting an amount of change determined by the final position of said selecting device.

56. In a machine of the class described, a change determining device, mechanism for adjusting the change determining device adapted to be set automatically in operation by deposited coins, and a manipulative device for readjusting said change determining device so that an amount of change may be ejected commensurate with its final position.

57. In a machine of the class described, the combination with a selecting device, mechanism for adjusting said selecting device adapted to be set automatically in operation by deposited coins, a manipulative device for readjusting differentially said selecting device, and means for ejecting an amount of change determined by the final position of said selecting device.

58. In a machine of the class described, the combination with a selecting device, mechanism for adjusting the selecting device adapted to be set automatically in operation and controlled in its movement by deposited coins to an extent commensurate with the value of coins deposited, a manipulative device for readjusting said selecting device to an extent commensurate with the amount of purchase, and means for ejecting an amount of change determined by the final position of said selecting device.

59. In a machine of the class described, the combination with a selecting device, of coin controlled spring operated devices for moving the same, a manipulative device for reversely moving said selecting device differentially, operating means for ejecting an amount of change determined by the final position of said selecting device, and means for locking said operating means against operation until said manipulative device has been operated.

60. In a machine of the class described, the combination with a selecting device, of mechanism for adjusting said selecting device adapted to be set in motion by deposited coins, a manipulative device for readjusting differentially said selecting device, operating means for ejecting an amount of change determined by the final position of said selecting device, and means for locking said operating means against operation until said manipulative device has been adjusted.

61. In a machine of the class described, the combination with coin holders, of coin ejectors, coin controlled spring operated selecting mechanism for the ejectors, operating means for operating the ejectors, and means for locking the operating means against operation until the selecting mechanism has been adjusted.

62. In a machine of the class described, the combination with controlling means, of a change determining device, successive adjustments of which are effected independently by deposited coins and the controlling means.

In testimony whereof I affix my signature in the presence of two witnesses.

EDMUND S. CHURCH.

Witnesses:
  Roy C. Glass,
  Carl W. Benst.